United States Patent
Deelstra et al.

(10) Patent No.: US 11,246,282 B2
(45) Date of Patent: Feb. 15, 2022

(54) MILKING ROBOT SYSTEM WITH IMPROVED TEAT DETECTOR

(71) Applicant: LELY PATENT N.V., PB Maassluis (NL)

(72) Inventors: Jentje Deelstra, PB Maassluis (NL); Martinus Petrus Kortekaas, PB Maassluis (NL)

(73) Assignee: LELY PATENT N.V., PB Maassluis (NL)

( * ) Notice: Subject to any disclaimer, the term of this patent is extended or adjusted under 35 U.S.C. 154(b) by 40 days.

(21) Appl. No.: 16/645,702

(22) PCT Filed: Sep. 12, 2018

(86) PCT No.: PCT/NL2018/050596
§ 371 (c)(1),
(2) Date: Mar. 9, 2020

(87) PCT Pub. No.: WO2019/059758
PCT Pub. Date: Mar. 28, 2019

(65) Prior Publication Data
US 2020/0275631 A1  Sep. 3, 2020

(30) Foreign Application Priority Data
Sep. 19, 2017 (NL) .................................... 2019574

(51) Int. Cl.
*A01J 5/017* (2006.01)
(52) U.S. Cl.
CPC .................... *A01J 5/0175* (2013.01)
(58) Field of Classification Search
CPC ................ A01J 5/0175; A01J 1/017
See application file for complete search history.

(56) References Cited

U.S. PATENT DOCUMENTS 3,878,819 A * 4/1975 Harman ................. A01J 5/017
119/14.08
5,275,124 A * 1/1994 van der Lely ......... A01J 7/022
119/14.08
(Continued)

FOREIGN PATENT DOCUMENTS

WO  WO 00/51417  9/2000
WO  WO-2008097093 A1 * 8/2008 ............... A01J 5/01
(Continued)

OTHER PUBLICATIONS

International Search Report dated Dec. 11, 2018 in PCT/NL2018/050596 filed on Sep. 12, 2018.

*Primary Examiner* — Magdalena Topolski
(74) *Attorney, Agent, or Firm* — Oblon, McClelland, Maier & Neustadt, L.L.P.

(57) ABSTRACT

A milking robot system for milking of a dairy animal with teats includes milking cups, a robot arm for attaching the milking cups to the teats, a teat detector configured to detect the position of the teats, and a compressed air system for providing dry compressed air to at least part of the milking robot system. The teat detector comprises a housing containing an optical sensor. The compressed air system is operatively connectable with the inside of the housing via an air line in order to at least partly replace air which is present in the housing by an amount of dry air from the compressed air system. This replacement operation may be performed directly, under pressure, or by first extracting air by means of an additional system and then replenishing it with dry air from the compressed air system.

14 Claims, 2 Drawing Sheets

(56) References Cited

U.S. PATENT DOCUMENTS

| | | | | |
|---|---|---|---|---|
| 5,345,890 | A | * | 9/1994 | Petersson ............... A01J 5/041 |
| | | | | 119/14.54 |
| 6,405,632 | B1 | * | 6/2002 | Liao .................... A01J 5/0175 |
| | | | | 91/361 |
| 6,425,346 | B1 | | 7/2002 | Birk |
| 2002/0162509 | A1 | * | 11/2002 | Hakes ................ G01N 1/2035 |
| | | | | 119/14.02 |
| 2005/0056224 | A1 | * | 3/2005 | Van Den Berg ....... A01J 5/017 |
| | | | | 119/14.02 |
| 2011/0239943 | A1 | * | 10/2011 | Hanskamp ............... A01J 5/08 |
| | | | | 119/14.02 |
| 2013/0247827 | A1 | | 9/2013 | Andersson et al. |
| 2016/0113228 | A1 | | 4/2016 | Holmertz |
| 2016/0295827 | A1 | | 10/2016 | Axelsson et al. |

FOREIGN PATENT DOCUMENTS

| | | | | |
|---|---|---|---|---|
| WO | WO-2009099317 A1 | * | 8/2009 | ............ A01J 5/047 |
| WO | WO-2010093239 A2 | * | 8/2010 | ............ G01F 15/08 |
| WO | WO 2012/087233 A1 | | 6/2012 | |
| WO | WO-2014055003 A1 | * | 4/2014 | ............ A01J 5/007 |
| WO | WO 2014/204391 A1 | | 12/2014 | |
| WO | WO 2015/041517 A1 | | 3/2015 | |
| WO | WO 2015/094092 A1 | | 6/2015 | |

* cited by examiner

MILKING ROBOT SYSTEM WITH IMPROVED TEAT DETECTOR

TECHNICAL FIELD

The present invention relates to a milking robot system for milking a dairy animal with teats, comprising milking cups, a robot arm for attaching the milking cups to the teats, a teat detector configured to detect the position of the teats, the teat detector comprising a housing containing an optical sensor.

BACKGROUND OF THE INVENTION

Such milking robot systems have been known for a few decennia. The performance of such a milking robot system greatly depends on the performance of the teat detector. If the teat detector does not work (well), the milking operation may not take place at all. The teat detectors are virtually always optical detectors which often suffer from condensation of water vapor on a window which protects the optical sensor. As a result of the condensation, the view is obscured and there is a greater risk of not detecting the teats and not attaching the milking cups.

SUMMARY OF THE INVENTION

It is an object of the present invention to provide an improved milking robot system, in particular one which suffers from fewer condensation problems near the teat detector.

To this end, the invention provides a milking robot system according to claim 1, in particular a milking robot system for milking of a dairy animal with teats, comprising milking cups, a robot arm for attaching the milking cups to the teats, a teat detector configured to detect the position of the teats, and a compressed air system for providing dry compressed air to at least part of the milking robot system, wherein the teat detector comprises a housing containing an optical sensor, wherein the compressed air system is operatively connectable with the inside of the housing via an air line in order to at least partly replace air which is present in the housing by an amount of dry air from the compressed air system. In this case, use is made of the understanding that a compressed air system virtually always uses conditioned air, in particular dried air with a very low dew point, in order to prevent condensation problems. Using such air for purging the housing of the teat detector has the effect that any water vapor which may have penetrated is efficiently removed again. In the present invention, the term "connectable" is understood to mean that the compressed air system can be placed in an operative flow communication with the housing autonomously by the milking robot system. This may be achieved by means of a butterfly valve, manifold valve, etc.

Specific embodiments are described in the dependent claims, as well as in the following part of the description. In particular, the compressed air system is furthermore provided with a venturi, to which venturi the air line which ends in the housing is connected, and which combination of the venturi and the air line is configured to suck out at least some of the air which is contained in the housing, wherein furthermore an aeration connection is provided between the housing and the compressed air system, which connection is configured to return the housing to ambient pressure by means of dry air from the compressed air system. In this case, the venturi causes a subatmospheric pressure, which makes it possible to suck air out of the housing. The aeration line then ensures that dry air from the compressed air system is added to the air in the housing. Thus, it is no longer necessary for a subatmospheric pressure to prevail in the housing permanently, which subatmospheric pressure would, over time, cause an increase in the amount of water vapor leaking in. Rather, the air in the housing is purged and replaced in this way.

It is an advantage of the invention that no superatmospheric pressure is required to purge the air from the housing. Such a superatmospheric pressure often places an additional strain on the construction, which is often less in the case of subatmospheric pressure. In addition, it is in principle possible to make the arrangement work without valves. In this case, the valves may be omitted from the air line because the latter is in principle continuously connected to the compressed air system, thus rendering the risk of indirect inflow of water vapor very small. Nevertheless, it is of course possible to provide a valve, such as a one-way valve or an actuable valve, in the air line, wherein the inside of the housing is then connectable to the compressed air system. Similarly, the aeration line may in principle be permanently connected to a supply of optionally spent compressed air, and may optionally be closable by means of a one-way or an actuable valve.

In theory, the compressed air system could ensure permanent extraction of air and thus also cause a permanent, slightly subatmospheric pressure, depending on the air resistance in the aeration line. Nevertheless, in practice, the compressed air system nearly always only allows an amount of compressed air to flow for a short period of time, when required. Such "bursts" of compressed air are often sufficient to replenish the air in the housing.

In embodiments, the milking device furthermore comprises a further housing, into which further housing at least some of the compressed air, optionally spent or not, flows, and wherein the air line or the aeration connection is in flow communication with the further housing. Such a further housing is sometimes used to blow spent compressed air, i.e. compressed air which has been used for the purpose for which the pressure was necessary, but which spent air is still dry, into a part of machinery which is also to be protected against condensation. An example of such a component is an electronics cabinet, which electrical circuits are susceptible to moisture. The further housing is only rarely airtight and does not have to be. Nevertheless, the continuous, optionally interrupted, supply of fresh dry air will ensure that the atmospheric humidity in the further housing likewise remains low. Thus, a supply of dry air is available which could, in principle, nevertheless become more moist over time, but which will remain sufficiently dry due to the replenishment. Alternatively, a special container or further housing may be provided for the sole purpose of containing such a supply of dry air. Such a container is, for example, a balloon or cylinder with a displaceable piston and a superatmospheric pressure opening for discharging a superatmospheric pressure of spent compressed air.

In embodiments, the milking system furthermore comprises a vacuum system, in particular for providing a milking vacuum and/or a pulsation vacuum at one or more of the milking cups, as well as comprising an actuable valve device by means of which the vacuum system is connectable to the inside of the housing in order to extract at least some of the air therefrom. As an alternative to the venturi, use is therefore made in this case of the vacuum system which is provided as standard with every milking device. Via a separate branch to the housing, which is closable by a valve, this vacuum system may extract some of the air from the housing, which may then be replenished, for example, via the aeration connection.

In embodiments, the air line and the aeration connection are one and the same. In this case, the air line firstly serves to extract air by the action of the venturi, while passing air through the compressed air system. After the compressed air has been moved, the same line may serve for aeration, since the subatmospheric pressure has been canceled and the remaining, optionally spent, compressed air can replenish the extracted air after the pressure has been brought to atmospheric pressure. Thus, a very simple system is obtained which is inherently very reliable, due to the absence of moving parts.

In embodiments, the aeration connection contains a valve which is configured to open when a subatmospheric pressure prevails in the housing compared to the environment (al pressure). In this case, the valve may be, for example, a non-return valve or a one-way valve which is set to open at a very low subatmospheric pressure in the housing of, for example, between 0.01 and 0.05 atmosphere (between 1 and 5 kPa). If the aeration line can, in this case, become subject to superatmospheric pressure from the compressed air system, it is also possible, for example, to provide a controlled valve which opens on the basis of a subatmospheric pressure measured in the housing. For example, a pressure sensor is then provided which measures the pressure in the housing, which sensor is operatively connected to a valve control which is likewise provided and serves to control said valve. Other configurations are possible. For example, the venturi line and the aeration connection are separate lines. Again, both lines may be provided without any valve or a valve such as described above, for example, may be provided in the aeration line. In principle, a valve which protects against superatmospheric pressure may also be provided in the venturi line. Nevertheless, in many cases, this is not necessary, since a subatmospheric pressure is actually generated when air flows past, whereas, if the venturi is provided in a part of the compressed air system which contains spent air, the air pressure does not have to be maintained in that part of the compressed air system and there is thus no danger of an undesired superatmospheric pressure in the housing.

In embodiments, the compressed air system is directly connected to the inside of the housing via a compressed air line in order to blow compressed air into the housing by means of the compressed air line, and in this case, the compressed air line comprises at least one of a superatmospheric pressure valve, which opens at a predetermined pressure difference or at a predetermined air pressure in the housing, or a membrane of watertight material which is permeable to water vapor, such as GORE-TEX®. In these embodiments, compressed air is blown directly into the housing in order to force out the air which is present in the housing and which may have become humid. In order to prevent the housing from becoming (excessively) strained due to an excessive superatmospheric pressure, a superatmospheric pressure valve may be advantageously provided, by means of which valve the excess of air may escape. To this end, the valve is for example configured to open at a superatmospheric pressure of between 0.02 and 0.2 atmosphere (2 and 20 kPa). The net effect is then effectively that compressed air purges the housing and thus removes moisture which has entered it. It is also possible to provide a membrane of watertight material which is permeable to water vapor, such as GORE-TEX®. Such a material allows air and water vapor to pass through, but blocks water. In this way, the air in the housing is protected against the ingress of, for example, flushing water, but water vapor is able to escape. It should be noted that, in this case, it is in principle also possible for water vapor to enter, so that a more frequent purging with air may be desirable in this case. Alternatively, instead of a superatmospheric pressure valve, a connecting line to a further housing may be provided, as described above, i.e. in which fresh dry air is provided regularly.

In embodiments, the teat detector comprises a feed connection containing an electrical connection for the optical sensor, which feed connection comprises said air line, in particular in the form of an at least partly hollow pipe. In these embodiments, the connection for powering the sensor which is often already provided is combined with an air line, that is the power supply cable simultaneously serves as an air line. Consequently, the overall construction does not become more complicated.

In important and advantageous embodiments, the compressed air system is furthermore configured to perform at least one functional task in the milking robot system which differs from replacing air in the housing. In this case, elegant use is made of a compressed air system which is already present, for another purpose. The purpose may vary greatly, as will be described in more detail below by means of special embodiments. Nevertheless, the compressed air system may also be provided solely in order to keep the air in the housing dry.

In embodiments, the robot arm comprises at least one pneumatic actuator for moving the robot arm, which pneumatic actuator is operatively connected to the compressed air system. Such an actuator is used in, for example, the Lely Astronaut® milking robots and there offers the advantage that, if the robot arm comes into contact with a dairy animal, this robot arm can readily move in the same direction without causing injury and without becoming damaged, due to the fact that the pneumatic actuator can act as an air spring. In addition, the respective actuator(s) is/are operated very regularly, but not continuously, so that it is possible to ensure that the air in the housing is replenished with great regularity. Obviously, one or more pneumatic actuators may also be provided for other purposes, such as for moving an additional arm, for rotating a brush, etc.

In embodiments, the compressed air system comprises a blow-off opening for blowing compressed air over the housing in a targeted manner. In these advantageous embodiments, the compressed air (partly) serves for blowing the housing clean and/or dry-blowing the housing. The optical sensor of the teat detector, or in general of any optical detector, is susceptible to dirt and the like. In order to protect the sensor therefrom, it is virtually always provided in a housing, as is the case in the present invention. Such a housing then comprises (or is) a part which is transparent for optical radiation, the window. This window may nevertheless still be soiled by dirt, water etc. which may hamper the optical sensor in performing its task. In order to prevent this, a dirt-removing device is often advantageously provided which often comprises a compressed air feature with a blow-off opening, by means of which blow-off opening the compressed air is blown over the housing, and in particular the window. Advantageously, a spray nozzle is often provided to support the removal of dirt, which spray nozzle sprays cleaning agent and/or water onto the housing/the window. Compressed air may then be used in order to remove any remaining droplets. In all such cases, the compressed air serves two different purposes, even for the detector, which makes elegant and compact constructions possible.

In embodiments, the milking robot system comprises a teat cup for cleaning and/or stimulating a teat, with which teat cup the compressed air system can be brought into flow communication. Such teat cups comprise an entrance for compressed air, and often also liquid, in order to blow dirt off the teat and/or to stimulate the teat in order to start up the milk let-down. Known systems fitted with such teat cups are, inter alia, the VMS™ robots of DeLaval. Also in this case, the compressed air system which is already present can advantageously be used to keep the air in the housing of the teat detector dry.

In embodiments, the milking robot system furthermore comprises a control unit which is operatively connected to the teat detector and the compressed air system, wherein the control unit is configured to operate the compressed air system in order to provide compressed air if it is found that the teat detector is unable to detect the position of the teats, in particular independently from another functional task of the compressed air system. Generally, regular operation of the compressed air system will be sufficient to keep the air in the housing dry. However, if this is found to be insufficient, i.e. if the teat detector is unable to determine the position of one or more teats, then the air may be found to be too humid and formation of condensation in the housing, at least on the window, may have taken place. This could occur, for example, if the compressed air system has not been activated for a long time, either as a result of a malfunction or an inadvertent absence of animals for a prolonged period of time, etc. In that case, it may be advantageous if the control unit activates the compressed air system, if possible, solely for the purpose of replenishing the air in the housing, even if no other application requires compressed air. For example, the control unit may be configured to activate the compressed air system after a predetermined time period after the last activation has lapsed.

Here, a general remark is that all mentioned embodiments of the milking robot system with a teat detector, as well as the associated advantages, in principle apply in full to milking robot systems with one or more other optical detectors, i.e. with a general optical detector. Such optical detectors may also be used to detect or measure parameters other than the teat positions, such as BCS (body condition score), animal or udder health, such as crippleness, activity or teat end health, or even the presence of an animal. In this case, use may be made of a standard video camera, an optical 3D camera or special optical cameras. All such optical detectors can benefit from the invention due to the fact that condensation problems are efficiently counteracted. It is mentioned again here that, in particular in milking robot systems which are already provided with a compressed air system, a branch for the purpose of replenishing air in the housing of the detector, as described in the present invention, forms an elegant, simple and reliable solution for these condensation problems. In still more general form, the invention relates to a livestock farming system comprising a device for performing an operation on a livestock animal and providing a control unit, a compressed air system for supplying dry compressed air to at least a part of the device, and an optical detector which is operatively connected to the control unit, wherein the detector comprises a housing containing an optical sensor, wherein the compressed air system is operatively connectable with the inside of the housing by means of an air line for at least partly replacing air which is present in the housing with an amount of dry air from the compressed air system. All other embodiments, technical effects and advantages described for the milking robot system of the present embodiment in principle also apply to such general systems.

The invention will now be explained in more detail by means of some non-limiting embodiments which are illustrated in the drawing, in which:

DETAILED DESCRIPTOR OF THE DRAWINGS

Figure 1:
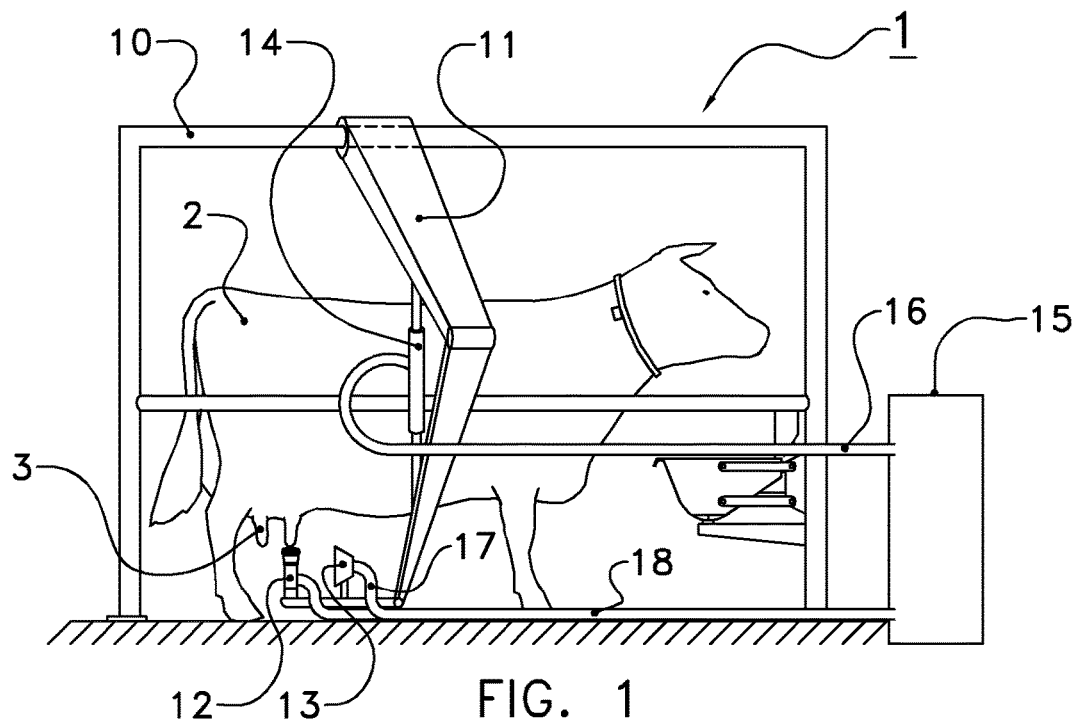
FIG. 1 shows a diagrammatic representation of a milking robot system according to the invention.

FIG. 1 shows a diagrammatic representation of a milking robot system 1 according to the invention, in which reference numeral 2 denotes a dairy animal, such as a cow, with teats 3. The milking robot system 1 comprises a milking stall 10, to which a robot arm 11 with milking cup 12 and a teat detector 13 is connected. A pneumatic actuator 14 is connected to a compressed air system 15 by means of an actuator connection 16. Finally, reference numeral 17 diagrammatically denotes an air line and reference numeral 18 denotes a compressed air line.

The milking robot system 1 as illustrated is suitable for milking dairy animals 2, such as cows. To this end, the system 1 comprises one or more milking cups 12, for cows four, but for the sake of clarity, only one is shown here. For the same reason, many other features used during the milking operation are not shown here, such as milking hoses, a milking glass, etc. These details are available to those skilled in the art, but are not relevant to the invention.

The system 1 furthermore comprises a robot arm 11, which parts may be moved by means of one or more actuators. In this example, only one actuator is shown, more particularly a pneumatic actuator 14, which is connected to a compressed air system 15 by means of an actuator connection 16. The compressed air system 15 is only shown in highly diagrammatic form and in this case serves, inter alia, to supply compressed air to the actuator 14, under the control of a control unit which is not shown in any more detail here. Incidentally, the robot arm does not have to be driven pneumatically.

In the illustrated example, the compressed air system 15 is furthermore connected to the milking cup 12 by means of the compressed air line 18. The compressed air which is thus providable may be used to clean and/or stimulate the teats 3, as is known per se from, for example, the DeLaval VMS™ system. The valves and the like required for the purpose are not shown in any more detail. In this case as well, this compressed air connection is optional.

The compressed air line 18 is furthermore connected to the teat detector 13 by means of an air line 17. As is known per se, the teat detector 13 serves to determine the positions of the teats 3 and nowadays in most cases is an optical detector. This means that the teat positions are determined by means of optical radiation. However, due to the optical measuring principle, the optical teat detector 13 is susceptible to dirt and moisture. In particular in a heavily soiled/soiling environment, such as a milking parlor, the milking robot system 1 as a whole and in particular the teat detector 13 will have to be cleaned often. Usually, water or a water-based cleaning liquid is used for this purpose, so that the moisture load of the teat detector 13 is relatively high. Soiling by the dairy animals with milk or urine may additionally increase the moisture load. In addition, milking parlours nowadays are often open, so that the atmospheric humidity, in particular when it is raining, may also form another additional source of ingressing water vapor. Added to this is the fact that the temperature of, in particular, the outside of the teat detector 13 may then drop in such a manner that the water vapor present therein condensates onto the optical window thereof. The present invention is aimed at providing a solution to that problem, and does this by, by means of the compressed air system, at least partly replacing the air in the teat detector 13 with dry air from this compressed air system. In order to, in effect, prevent the same problems, but then in the compressed air system 15 or the components actuated thereby, the air which is delivered by the compressed air system is, in most cases, very dry air with a very low dew point. Such air is outstandingly suitable for filling the teat detector 13. All this will be explained in more detail by means of the diagrammatic detail FIGS. 2-4.

Figure 2:
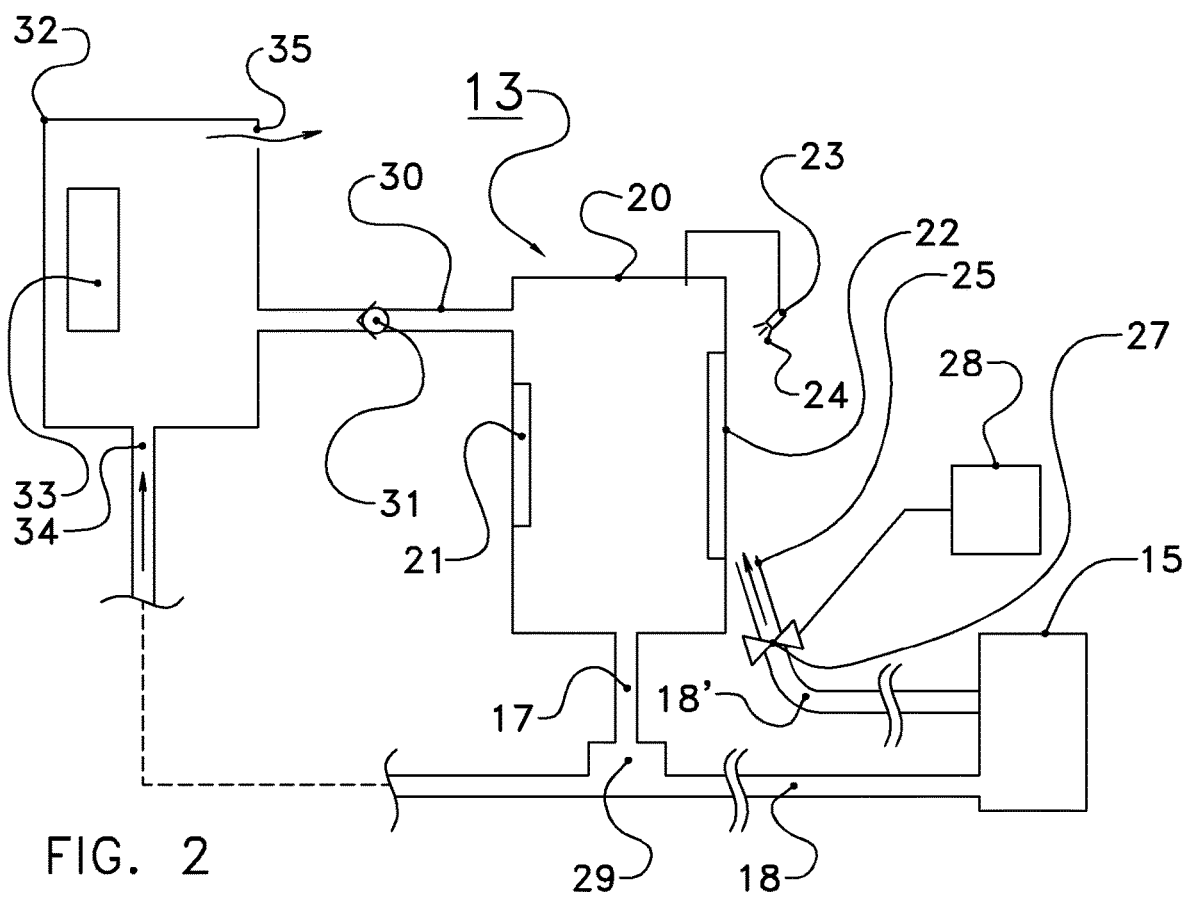
FIG. 2 shows a diagrammatic detail view of a part of the milking robot system.

FIG. 2 shows a diagrammatic detail view of a part of the milking robot system 1. In the entire drawing, similar parts are denoted by the same reference numerals. Furthermore, the teat detector 13 here comprises a housing 20 containing an optical sensor 21 and a window 22. Reference numeral 23 denotes a spray nozzle for cleaning liquid 24 and reference numeral 25 denotes a blow-off opening for compressed air in the direction of the arrow, from a compressed air line 18' which is closable with a valve 27 which is actuable by the control unit 28.

Further down, a diagrammatically indicated venture 29 is fitted to the compressed air system, to which an air line 17 is connected which is in turn connected to the housing 20. An aeration line/aeration connection 30 is also connected to the housing 20 and is connected by a non-return valve 31 to a further housing 32 which contains electronics 33 and on which an air supply 34 and an air outlet opening 35 are provided.

In this example, the compressed air system 15 provides compressed air to the outlet opening 25 in order to blow the outside of the window 22 dry after it was sprayed with cleaning liquid 24 from the spray nozzle 23. This is carried out, for example, regularly, such as after every milking operation or when the milking robot has not succeeded in attaching the cups, and in each case under the control of the control unit 28. To this end, the control unit 28 can open the actuable valve 27 and subsequently close it again. The air then blows over the window 22 in the direction of the arrow. Not only are other spraying and blowing devices/directions possible, but both the spray nozzle 23 and the compressed air line 18' with the blow-off opening 25 are entirely optional. Nevertheless, these are examples of different applications for compressed air in a milking robot system 1 which may then have several functions.

In this example, a venturi 29 is provided in one of the lines of the compressed air system, where a subatmospheric pressure results when a restriction is effected. This subatmospheric pressure also prevails in the air line 17 connected to the venturi and, via this line, also in the housing 20 of the teat detector 13. In this way, at least some the air which is present therein is extracted, together with any water vapor.

Thus, a subatmospheric pressure would be created in the housing 20, were it not for the non-return valve 31 opening which thereby opens the aeration line/aeration connection 30 which is connected to the further housing 32. This further housing 32 is purged with, optionally spent, compressed air from the compressed air system 15 which is delivered by means of the air supply 34 and from there expels the air which is present by means of the air outlet opening 35. Therefore, the air in the further housing 32 is also continually replenished by dry, optionally spent compressed air. The purpose thereof is, for example, to also protect sensitive components, such as electronics 33, against the undesired consequences of the presence of water vapor which is, after all, detrimental to more than just the optical detector 13.

The air in the further housing 32 which is consequently still dry is available by way of the aeration line/aeration connection 30. When air is sucked out of the housing 20 of the teat detector 13, the resulting subatmospheric pressure will cause the non-return valve 31 to open, so that some of the dry air can flow from the further housing 32 to the housing 20.

In this embodiment, the compressed air system 15 can regularly deliver compressed air to the compressed air line 18 and, from there, indirectly to the air line 17 and the air supply 34. If desired, this may even take place in an uninterrupted manner. In addition, it is possible to configure the control unit 28 in such a way that, if the control unit 28 which is operatively connected to the teat detector 13 (connection not shown) determines that the teat detector 13 is unable to determine one or more teat positions, whether repeatedly or not, it allows the compressed air system 15 to provide compressed air to at least the line which is connected to venturi 29, even if no compressed air is required elsewhere in the milking robot system at that moment. This makes it possible for the ventilation which is thus provided to evaporate any condensation which is present in the housing 20 or on the window 22.

In a practice test, three teat detectors were placed in a controlled environment at 25° C. and 85% relative atmospheric humidity. The dew point of the air in the teat detectors had an initial value of between −8.9 and −14.3° C. The air in the housing of the teat detector was sucked off by means of a venturi in a compressed air line once every 5 minutes (roughly once per milking session) to a subatmospheric pressure of 10 kPa. The compressed air flowed into an electronics cabinet and was fed back from there in order to return the housing to ambient pressure. The (spent) compressed air in this case had a dew point of −35° C. Due to leaking in of water vapor, the dew point initially increased to a greater extent than could be compensated for by replenishing with dry air. In approximately two weeks, the dew point gradually increased to between −2.0 and +0.9° C. But in view of the relatively extreme conditions, such a dew point, which even at high atmospheric humidity is still approximately 25° C. below the ambient temperature, is sufficiently low to prevent condensation problems.

Figure 3:
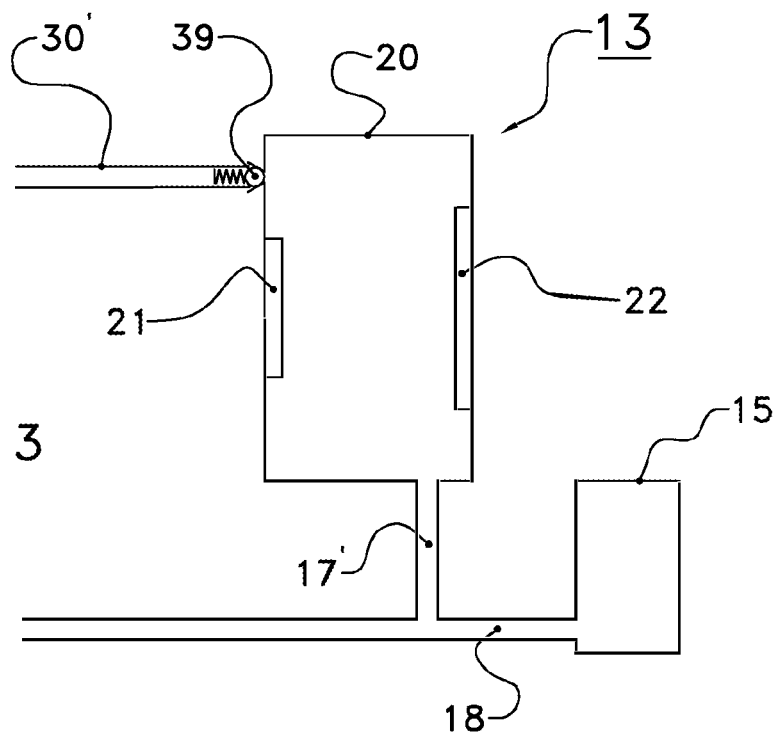
FIG. 3 shows a diagrammatic detail view of a first alternative part of the milking robot system.

FIG. 3 shows a diagrammatic detail view of a first alternative part of the milking robot system 1. In this case, the compressed air line 18 is directly connected to the air line/aeration connection 17' and thus to the housing 20 and can thus take the supplied compressed air partly to the inside. Advantageously, a reduction valve (not shown) may be provided in one or more of the lines so as not to exert full pressure. Also, a superatmospheric pressure valve 39, located within aeration line 30', is provided, which opens at a predetermined superatmospheric pressure in the housing 20 of, for example, (already) one or several kPa, such as 10 kPa. The net effect is then that the air flowing in virtually immediately opens the superatmospheric pressure valve 39 and thus largely replenishes the air. It is also possible to replace the valve 39, which, due to its nature then has to be made slightly weak, by a controlled valve which opens, for example, at the same time as the compressed air is delivered. As a result, it is possible to ensure that the valve can be closed more tightly when no compressed air is delivered, without there being any danger of an undesirably large superatmospheric pressure being created in the housing.

Figure 4:
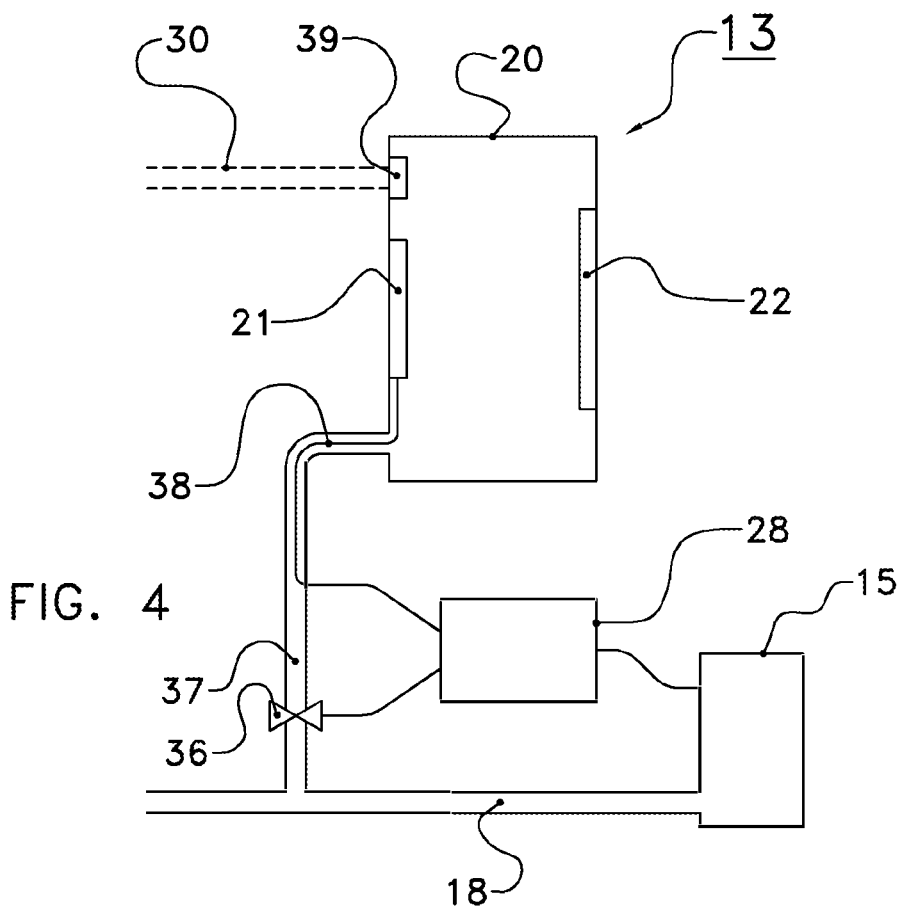
FIG. 4 shows a diagrammatic detail view of a second alternative part of the milking robot system.

FIG. 4 shows a diagrammatic detail view of a second alternative part of the milking robot system 1. Here, a combination of an air line in the form of a hollow feed connection 37 as in the other embodiments is provided, containing an electrical power supply cable 38 for the optical sensor 21. This makes a virtue of necessity with regard to the passage through the housing of the power supply by making it hollow and connecting it to the further (air) lines. Incidentally, a sensor cable (not shown) for transmitting a sensor view may also be passed through the hollow cable 38. The valve 36 which is actuable by the control unit 28 may in this case serve to control the aeration of the housing 20. And in this case as well, the hollow feed connection may be connected to a venturi and thus suck off air or, rather, be directly connected to the compressed air line and thus blow air into the housing 20. Depending on the type of connection which is chosen, a superatmospheric pressure valve or an aeration line may be provided at 39 or 30, respectively, entirely in accordance with above-described examples, or a effective alternative.

The invention claimed is:

1. A milking robot system for milking of a dairy animal with teats, comprising:
    milking cups,
    a robot arm for attaching the milking cups to the teats,
    a teat detector configured to detect of the position of the teats, and
    a compressed air system for providing dry compressed air to at least part of the milking robot system,
    wherein the teat detector comprises a teat detector housing containing an optical sensor,
    wherein the compressed air system is operatively connected with an inside of the housing via an air line that is connected to a venturi in order to at least partly replace air present in the teat detector housing by an amount of dry air from the compressed air system,
    wherein the venturi and the air line combination is configured to suck out at least some of the air contained in the teat detector housing, and
    an aeration connection provided between the teat detector housing and the compressed air system,
    wherein the aeration connection is configured to return the teat detector housing to ambient pressure by means of dry air from the compressed air system.

2. The milking robot system as claimed in claim 1, wherein the milking device furthermore comprises a further housing, wherein at least some of the compressed air flows into the further housing, and wherein the air line or the aeration connection is in flow communication with the further housing.

3. The milking robot system as claimed in claim 2, wherein the compressed air flowing into the further housing is spent air.

4. The milking robot system as claimed in claim 1, wherein the air line and the aeration connection are one and the same.

5. The milking robot system as claimed in claim 1, wherein a valve is placed in the aeration connection and is configured to open when a subatmospheric pressure prevails in the teat detector housing compared to an environmental pressure.

6. The milking robot system as claimed in claim 5, wherein the valve is a non-return valve or a one-way valve.

7. The milking robot system as claimed in claim 1,
    wherein the compressed air system is directly connected to the inside of the teat detector housing via a compressed air line in order to blow compressed air into the teat detector housing by means of the compressed air line, and
    wherein the compressed air line comprises at least one of a superatmospheric pressure valve, wherein the superatmospheric pressure valve opens at a predetermined pressure difference or at a predetermined air pressure in the teat detector housing, or a membrane of watertight material, wherein the membrane is permeable to water vapor.

8. The milking robot system as claimed in claim 1, wherein the teat detector comprises a feed connection containing an electrical connection for the optical sensor, wherein the feed connection to the optical sensor comprises said air line.

9. The milking robot system as claimed in claim 8, wherein the air line is in the form of an at least partly hollow pipe.

10. The milking robot system as claimed in claim 1, wherein the compressed air system is furthermore configured to perform at least one functional task in the milking robot system, wherein the at least one functional task differs from replacing air in the teat detector housing.

11. The milking robot system as claimed in claim 10, wherein the robot arm comprises at least one pneumatic actuator for moving the robot arm, wherein the at least one pneumatic actuator is operatively connected to the compressed air system.

12. The milking robot system as claimed in claim 10, wherein the compressed air system comprises a blow-off opening for blowing compressed air over the teat detector housing in a targeted manner.

13. The milking robot system as claimed in claim 10, wherein the milking robot system comprises at teat cup for cleaning and/or stimulating a teat, wherein the compressed air system can be brought into flow communication with the teat cup.

14. The milking robot system as claimed in claim 1, furthermore comprising a control unit operatively connected to the teat detector and the compressed air system,
    wherein the control unit is configured to operate the compressed air system in order to provide compressed air if it is found that the teat detector is unable to detect a position of the teats.

\* \* \* \* \*